(12) United States Patent
Darcie et al.

(10) Patent No.: US 7,369,715 B2
(45) Date of Patent: May 6, 2008

(54) PHOTONIC LINK USING ANGLE MODULATION AND METHOD OF USE THEREOF

(75) Inventors: Thomas E. Darcie, Victoria (CA); Peter F. Driessen, Sidney (CA)

(73) Assignee: University of Victoria Innovation and Development Corporation, Victoria, B.C. (CA)

( * ) Notice: Subject to any disclaimer, the term of this patent is extended or adjusted under 35 U.S.C. 154(b) by 0 days.

(21) Appl. No.: 11/493,501

(22) Filed: Jul. 25, 2006

(65) Prior Publication Data

US 2007/0041735 A1 Feb. 22, 2007

Related U.S. Application Data

(60) Provisional application No. 60/710,453, filed on Aug. 22, 2005.

(51) Int. Cl.
*G02F 1/01* (2006.01)
*G02F 1/035* (2006.01)

(52) U.S. Cl. .................................. 385/3; 385/1; 385/2

(58) Field of Classification Search ................. 385/1–3
See application file for complete search history.

(56) References Cited

U.S. PATENT DOCUMENTS

| | | | |
|---|---|---|---|
| 5,109,441 A | | 4/1992 | Glaab |
| 5,168,534 A | | 12/1992 | McBrien et al. |
| 5,644,665 A | | 7/1997 | Burns et al. |
| 5,777,778 A | * | 7/1998 | Yao .............................. 359/245 |
| 6,181,453 B1 | | 1/2001 | Darcie et al. |
| 6,282,005 B1 | | 8/2001 | Thompson et al. |
| 6,335,814 B1 | * | 1/2002 | Fuse et al. ................... 398/201 |
| 6,359,716 B1 | | 3/2002 | Taylor |
| 6,744,546 B2 | * | 6/2004 | Nakamura et al. .......... 359/237 |
| 7,079,780 B1 | | 7/2006 | Rollins |
| 2002/0033987 A1 | * | 3/2002 | Fuse et al. .................. 359/182 |
| 2005/0286908 A1 | * | 12/2005 | Way ............................ 398/186 |
| 2006/0285787 A1 | * | 12/2006 | Sakane et al. ................. 385/3 |

OTHER PUBLICATIONS

Burns et al., "Multi-octave operation of low-biased modulators by balanced detection," *IEEE Photonics Technol. Lett.* 8:130-132 (1996).
Cai et al., "Optical frequency modulation links: theory and experiments," *IEEE Transactions on Microwave Theory and Techniques* 45:505-511 (1997).
Chen et al., "FM subcarrier fiber optical transmission system design and its application in next-generation wireless access," *IEEE Journal of Lightwave Technology* 16:1137-1148 (1998).

(Continued)

*Primary Examiner*—Hemang Sanghavi
*Assistant Examiner*—Kajli Prince
(74) *Attorney, Agent, or Firm*—Klarquist Sparkman, LLP

(57) ABSTRACT

Embodiments of a photonic link having low residual carrier, for use in transmitting information between an electronic signal source and an electronic signal receiver is provided. The photonic link comprises a transmitter, which uses angle modulation, and two threshold optical frequency discriminators that are biased to provide large even-order distortion, an optical signal receiver and at least one transmission fiber to transmit complementary modulated signals between the transmitter and the optical signal receiver, whereby the optical signal receiver reconstructs the complementary modulated signals into the electronic information for acceptance by the electronic signal receiver. Exemplary methods of transmitting information are also provided.

38 Claims, 5 Drawing Sheets

OTHER PUBLICATIONS

Cox III et al., "An analytic and experimental comparison of direct and external modulation in analog fiber-optic links," *IEEE Trans. Microwave Theory and Techniques* 38:501-509 (1990).

Darcie et al., "Noise reduction in class-AB microwave-photonic links," *IEEE Microwave Photonics 2005 Conference Proceedings*, (Seoul, Korea, Oct. 2005).

Delavaux et al. "Multiple-output $E_r^{3+}$ amplifier for analog and QAM distribution systems," *Optical Fiber Communications Conference* 3:WDD30-1-3 (2001).

Esman et al, "Wideband efficiency improvement of fiber optic systems by carrier subtraction," *IEEE Photonics Technol. Lett.* 7:218-220 (1995).

Georges et al., "Broadband microwave fiber-optic links with RF phase control for phased-array antennas," *IEEE Photonics Technol. Lett.* 5:1344-1346,(Nov. 1993).

Lindsay, "An analysis of coherent carrier suppression for photonic microwave links," *IEEE Trans. Microwave Theory and Tech.* 47:1194-1200 (1999).

Mao et al., "Brillouin scattering in externally modulated lightwave AM-VSB transmission systems," *IEEE Photonics Technol. Lett.* 4:287-289 (1992).

Mathai et al., "Experimental demonstration of a balanced electroabsorption modulated microwave photonic link," *IEEE Trans. Microwave Theory and Tech.* 49:1956-1961 (2001).

Murakoshi et al., "Proposal of SCM optical FM method with nonlinear compensation technique in radio on fiber link," *Microwave Photonics, 2004, MWP'04, 2004 IEEE International Topical Meeting*, pp. 237-240 (2004).

Nichols et al., "Optimizing the ultrawide-band photonic link," *IEEE Trans. Microwave Theory and Techniques* 45:1384-1389 (1997).

Phillips et al., "Nonlinear distortion generated by dispersive transmission of chirped intensity-modulated signals," *IEEE Photonics Technol. Lett.* 3:481-483 (1991).

Rivas et al., "Transmitter macrodiversity in radio fibre microcellular networks," *Personal, Indoor and Mobile Radio Comm.* 3:1074-1078 (1997).

Trask, "High efficiency broadband linear push-pull power amplifiers using linearity augmentation", *IEEE International Symposium on Circuits and Systems* 2:II-432-II-435 (2002).

Wood et al., "(FTTH) system providing broad-band data over cable modems along with analog and digital video," *IEEE Photonics Tech. Lett.* 11:475-477 (1999).

Cox III et al., Analog Optical Links: Theory and Practice, 288 pp. (2004).

Phillips et al., "Lightwave Analog Video Transmission," in Optical Fiber Telecommunications IIIA, Chapter 14, pp. 523-559 (1997).

\* cited by examiner

PHOTONIC LINK USING ANGLE MODULATION AND METHOD OF USE THEREOF

CROSS REFERENCE TO RELATED APPLICATION

This application claims the benefit of U.S. Provisional Patent Application No. 60/710,453, filed 22 Aug. 2005, and entitled "PHOTONIC LINK USING ANGLE MODULATION AND METHOD OF USE THEREOF," which is hereby incorporated herein by reference.

FIELD

The disclosed technology relates to photonic links for transmitting information to and from users. More specifically, the disclosed technology relates to a system and method wherein the residual optical carrier is reduced through the use of angle-modulation techniques, thus reducing both shot noise and relative-intensity noise (RIN).

BACKGROUND

Analog or microwave-photonic optical links have found widespread application in numerous sectors of communications. All modern cable-television networks use high-performance linear lasers and optical fiber to deliver the entire spectrum of analog video and subcarrier-modulated digital data to and from small groups of subscribers. See, e.g., T. E. Darcie, M. R. Phillips, "Lightwave Video Transmission," Chapter in *Optical Fiber Telecommunications IIIA*, Academic Press, NY, 1997. Other broadband access or last-mile networks, like the fiber-to-the-premises networks being deployed by telephone carriers throughout the world, also use analog optical links for transmission of broadband RF-modulated signals. See, e.g., T. H. Wood, G. C. Wilson, R. D. Feldman, J. A. Stiles, "(FTTH) system providing broad-band data over cable modems along with analog and digital video," *IEEE Photonics Technol. Lett.*, Volume 11, Issue 4, pp. 475-477 (April 1999). With the allocation of new high-frequency (e.g. 60 GHz) microwave bands for communications networks, optical links become an essential component in overcoming loss associated with coaxial or waveguide alternatives. Cellular base stations are often connected to remote antennas or groups of antennas by microwave-photonic links. See, e.g., I. Rivas, L. B. Lopes, "Transmitter macrodiversity in radio fibre microcellular networks," *Personal, Indoor and Mobile Radio Comm., PIMRC*, Vol. 3, pp. 1074-1078 (Sep. 1-4, 1997). Phased-array microwave and millimeter-wave antennas use microwave-photonic links to deliver phase reference and signal information to and from centralized processors. See, e.g., J. B. Georges, K. Y. Lau, "Broadband microwave fiber-optic links with RF phase control for phased-array antennas," *IEEE Photonics Technol. Lett.*, Vol. 5, Issue 11, pp. 1344-1346 (November 1993). In short, the transmission of microwave information as modulated optical signals through optical fiber has become an essential tool in modern communications networks. As a result, considerable work has gone into maximizing the performance of these links. See, e.g., C. H. Cox III, G. E. Betts, and L. M. Johnson, "An analytic and experimental comparison of direct and external modulation in analog fiber-optic links," *IEEE Trans. Microwave Theory and Techniques*, vol. 38, pp. 501-509, May 1990; L. T. Nichols, K. J. Williams, and R. D. Esman, "Optimizing the ultrawide-band photonic link," *IEEE Trans. Microwave Theory and Techniques*, vol. 45, pp. 1384-1389 (August 1997).

Impairments introduced by microwave-photonic links (MPLs) include primarily noise and distortion. Noise limits the minimum microwave signal level that can be detected. Linearity limits the maximum microwave signal power that can be transmitted. The difference between minimum and maximum is described by the spur-free dynamic range (SFDR), one of the key figures of merit for an MPL. See, e.g., C. H. Cox, III, "Analog Optical Links: Theory and Practice," Cambridge, 2004. Performance is measured by the ability of the optical link to preserve the fidelity of the transmitted microwave signal, as measured by parameters like the SFDR, composite-triple beat (CTB), carrier-to-noise-ratio (CNR), and link gain. Collectively, these parameters describe the ability of the link to deliver large modulated signals while minimizing noise or interference.

In most conventional MPLs, the intensity of a light source (directly-modulated laser or continuous-wave (CW) laser followed by an external modulator) is biased to a linear operating point, and the RF signal is applied symmetrically about this bias point to modulate the light intensity. The DC light intensity, or residual carrier, associated with this bias carries no information, but is responsible for many of the limitations of the link performance. Shot noise and relative-intensity noise (RIN), often the dominant noise sources in high-power links, result directly from the detection of this residual carrier. In systems using optical amplifiers, beating between the carrier and amplified spontaneous emission result in high levels of signal-spontaneous beat noise. Also, the available gain of the optical amplifier is consumed or saturated by this residual carrier, rather than by the desired signal. See, e.g., J. M. P. Delavaux, A Yeniay, B Neyret, C. Hullin, G. R. Wilson, "Multiple-output Er-3+ amplifier for analog and QAM distribution systems," *Optical Fiber Communications Conference*, Vol. 3., pp. WDD30-1-3 (2001). The residual carrier is subject to optical nonlinearities (stimulated Brillouin scattering (see, e.g., X. P. Mao, G. E. Bodeep, R. W. Tkach, A. R. Chraplyvy, T. E. Darcie, R. M. Derosier, "Brillouin scattering in externally modulated lightwave AM-VSB transmission systems," *IEEE Photonics Technol. Lett.*, Vol. 4, Issue 3, pp. 287-289 (March 1992)), nonlinear refractive index (see, e.g., M. R. Phillips, T. E. Darcie, D. Marcuse, G. E. Bodeep, N. J. Frigo, "Nonlinear distortion generated by dispersive transmission of chirped intensity-modulated signals," *IEEE Photonics Technol. Lett.*, Volume 3, Issue 5, pp. 481-483 (May 1991), stimulated Raman scattering) limiting the amount of power that can be transmitted through the fiber. Finally, this residual carrier constitutes most of the power that saturates the photodetector, limiting the maximum signal power. Hence the DC bias required to operate at a linear operating point limits both the low end (noise) and high end (signal power) of the SFDR.

A variety (6 classes) of techniques has been proposed to mitigate the effect of the residual carrier. First, the carrier can be reduced through optical filtering. See, e.g., R. D. Esman, K. J. Williams, "Wideband efficiency improvement of fiber optic systems by carrier subtraction," *IEEE Photonics Technol. Lett.*, Vol. 7, No. 2, pp. 218-220 (February 1995). This has the same effect as increasing the modulation index (or lowering the DC bias) with commensurate increases in nonlinear distortion.

Second, coherent techniques have been proposed which use heterodyne detection to overcome the linearity associated with low-bias operation of a Mach Zehnder (MZ) external modulator. A. C. Lindsay, "An analysis of coherent carrier suppression for photonic microwave links," *IEEE Trans. Microwave Theory and Tech.*, Vol. 47, Issue 7, pp. 1194-1200 (July 1999). Unfortunately, the local oscillator generates noise that will offset the low-bias gain, and considerable complexity is added, including a frequency-stabilized laser that is required at the receiver.

Third, the bias can be modulated dynamically in response to the instantaneous magnitude of the RF envelope. See, e.g., U.S. Pat. No. 6,181,453 entitled "Method and apparatus for laser performance enhancement" and issued on Jan. 30, 2001 to T. E. Darcie and P. P. Ianonne. This can reduce the effective DC level, especially for signals with large peak factors, but the nonlinear mixing between the signal and bias modulation (the square of the signal) creates problematic third-order distortion. Also, while this approach can reduce noise from the residual carrier, the minimum average power remains substantially larger than zero, limiting the ultimate improvement.

Fourth, common-mode RIN (RIN present at the input to a Mach-Zehnder modulator (MZ)) can be cancelled using two fibers and a balanced photodetector. See, e.g., S. Mathai, F. Cappelluti, T. Jung, D. Novak, R. B. Waterhouse, D. Sivco, A. Y. Cho, G. Ghione, M. C. Wu, "Experimental demonstration of a balanced electroabsorption modulated microwave photonic link," *IEEE Trans. Microwave Theory and Tech.*, Vol. 49, pp. 1956-1961 (October 2001). Significant suppression of RIN has been demonstrated, but this does not affect the other challenges associated with the large residual carrier. Also, it has been shown that this technique results in reduced suppression of intensity noise for signals with larger modulation index.

Fifth, low-bias techniques have been explored in which an MZ is operated at lower bias than the conventional quadrature bias point (50% transmission). Unfortunately, this increases the distortion and decreases the signal, limiting the usefulness of the approach. In an attempt to reduce the distortion of this low-bias technique, an approach was explored in which 2 MZs were operated in an anti-symmetric manner with a balanced detector. See, e.g., W. K. Burns, G. K. Gopalakrishnan, R. P Moeller, "Multi-octave operation of low-biased modulators by balanced detection," *IEEE Photonics Technol. Lett.*, Volume 8, Issue 1, pp. 130-132 (January 1996). Reduction of second-order distortion was demonstrated, but maintaining the appropriate balances was challenging and overall improvement in noise was not demonstrated. The intent was to minimize second-order distortion in a low-biased link to achieve broadband operation. Hence the modulators were biased at an operating point at which the even-order distortion was small.

Finally, the sixth class of technique that has been proposed recently uses Class-AB techniques similar to those used in electronic amplifiers. See, e.g., C. Trask, "High efficiency broadband linear push-pull power amplifiers using linearity augmentation," *IEEE International Symposium on Circuits and Systems, ISCAS* 2002, Volume 2, pp. 11-432 to 11-435 (May 26-29, 2002). With class-AB MPLs (see, e.g., T. E. Darcie, A. Moye, P. F. Driessen, J. Bull, H. Kato, N. A. F. Jaeger, "Noise reduction in class-AB microwave-photonic links," *IEEE Microwave Photonics* 2005 *Conference Proceedings*, (Seoul, Korea, October 2005)), non-linear threshold electro-optic converters (NTEOCs) are used to approximately half-wave rectify the modulating signal in the output intensity modulation. Positive and negative portions of the signal are transmitted on separate but phase-matched optical paths, and recombined using a balanced photodetector. The balanced detector recreates a replica of the complete input modulated signal, and does so with close to zero DC current. Hence noise associated with the DC (or residual carrier) is minimized. A significant challenge associated with implementing Class-AB MPLs is in obtaining NTEOCs with appropriate transfer functions. Most intensity modulators have light intensity transmission-versus-voltage transfer functions that are sinusoidal. This is far from the ideal transfer function and results in a substantial departure from ideal system performance. While other approaches have been proposed, operation of a class-AB MPL with a more-suitable transfer function has not been demonstrated.

Other improvements have been proposed for MPLs through the use of optical angle modulation. These have attempted to overcome the nonlinearity associated with the transfer (voltage-to-transmission) of the directly- or externally-modulated source, or to cancel intensity noise. In A. Murakoshi, K. Tsukamoto, S. Komaki, "Proposal of SCM optical FM method with nonlinear compensation technique in radio on fiber link," *Microwave Photonics,* 2004, *MWP'04,* 2004 *IEEE International Topical Meeting,* pp. 237-240 (Oct. 4-6, 2004), angle modulation of the optical carrier is used in combination with an optical filter or frequency discriminator to transmit microwave signals. The filter converts the angle modulation into amplitude modulation with potentially better linearity that an intensity-modulated system. However, this technique introduces substantial complexity and does not address the issue of noise associated with the residual carrier. In U.S. Pat. No. 6,359,716 entitled "All-optical analog FM optical receiver" and issued on Mar. 19, 2002 to Robert B. Taylor, a novel filter configuration is proposed to cancel intensity noise. This single-sideband approach is uses optical angle modulation and optical filters designed to pass both the carrier and upper or lower sidebands. As such, it does not address the issue of reduction of noise associated with the residual carrier. Coherent techniques have also been proposed in conjunction with optical frequency modulation. See, e.g., B. Cai, A. J. Seeds, "Optical frequency modulation links: theory and experiments," *IEEE Transactions on Microwave Theory and Techniques*, Volume 45, Issue 4, pp. 505-511 (April 1997). However, these add substantial complexity and do not result in commensurate performance improvement.

Finally, a large body of work has been produced (see, e.g., I. H. Chen, H. W. Tsao, "FM subcarrier fiber optical transmission system design and its application in next-generation wireless access," *IEEE Journal of Lightwave Technology*, Volume 16, Issue 7, pp. 1137-1148 (July 1998)) exploring the conversion of the input microwave information into an electronic frequency-modulated (FM) signal prior to transmission over a conventional MPL, exploiting the well-known robustness of FM signals to noise. However, suitable broadband modulators/demodulators to convert the input signal to an FM signal have proved difficult to produce and undesirable. Also, the large bandwidth of the resulting electronic FM signal is difficult to transmit over the MPL.

To summarize, there are 3 main causes of noise in a MPL: Receiver noise; shot noise; and relative intensity noise (RIN). Shot noise power increases linearly with total received power. Noise from RIN increases as the square of total received power. Receiver noise is independent of received power. While the prior art has been somewhat successful in reducing receiver noise and the effect of RIN, to date and to our knowledge, no practical method for reducing shot noise has been defined and RIN continues to be a problem. It is an object to overcome the deficiencies of the prior art.

SUMMARY

In one disclosed embodiment, a photonic link using angle modulation that has low residual carrier, for use in transmitting information between an electronic signal source and an electronic signal receiver is provided. The photonic link comprises: a transmitter to accept electronic information from the electronic signal source and to transmit optical signals, the transmitter comprising an angle-modulated optical source to convert the electronic information into an angle-modulated optical signal; and a first and second threshold optical frequency discriminator (TOFD), each TOFD biased to provide large even-order distortion; the first TOFD being complementary to the second TOFD, to provide a first and second intensity-modulated signal, the first modulated signal being complementary to the second modulated signal; and a first optical transmission network to distribute the angle-modulated optical signals from the transmitter to each of the first and second TOFD, an optical signal receiver; and a second optical transmission network to transmit the complementary intensity-modulated signals between the first and second TOFD and the optical signal receiver, whereby the optical signal receiver reconstructs the complementary modulated signals into the electronic information for acceptance by the electronic signal receiver.

In one aspect, the transmitter comprises an externally modulated laser.

In another aspect, the transmitter comprises a directly modulated laser.

In another aspect, the first optical transmission network comprises a power splitter and two optical paths.

In another aspect, the transmitter and the first and second TOFDs are co-located within a transmitter apparatus.

In another aspect, the receiver and the first and second TOFDs are co-located within a receiver apparatus.

In another aspect, the TOFDs are optical fiber Bragg-grating filters.

In another aspect, the first and second intensity-modulated signals are obtained by reflection from the TOFDs.

In another aspect the TOFDs are implemented on planar silica-based waveguides.

In another aspect, the first and second intensity-modulated signals are obtained by transmission through the TOFDs.

In another aspect, the second optical transmission network comprises two optical paths.

In another aspect, the second optical transmission network includes a multiplexing apparatus to combine the two intensity-modulated optical signals onto one optical path.

In another aspect, the optical signal receiver comprises a balanced receiver.

In another aspect, the balanced receiver comprises a first and a second photodetector, each having an anode and a cathode, wherein the anode of the first photodetector is connected to the cathode of the second photodetector, such that in use, the electronic information is reconstructed.

In another aspect, the optical transmission paths comprise free-space optical paths.

In another aspect, the optical transmission paths comprise optical fiber paths.

In another embodiment, a photonic link having low residual carrier, for use in transmitting information between an electronic signal source and an electronic signal receiver is provided. The photonic link comprises: a transmitter to accept electronic information from the electronic signal source and to transmit optical signals; the transmitter comprising a first and second non-linear threshold electronic to optical converter (NTEOC) to convert the electronic information into optical signals, the first NTEOC being complementary to the second NTEOC and wherein the NTEOC are biased to provide large even-order distortion, to provide a first and second modulated signal, the first modulated signal being complementary to the second modulated signal; the first and second NTEOC comprising an angle-modulated optical source and a first and a second TOFD; an optical signal receiver, the optical signal receiver comprising a first and a second photodetector, each having an anode and a cathode, wherein the anode of the first photodetector is connected to the cathode of the second photodetector; an optical transmission network to transmit the complementary modulated signals between the transmitter and the optical signal receiver, whereby the optical signal receiver reconstructs the complementary modulated signals into the electronic information for acceptance by the electronic signal receiver.

In one aspect, the optical transmission network comprises two optical paths.

In another aspect, the optical transmission network comprises a multiplexing apparatus to combine the first and the second modulated signals onto one optical path.

In another embodiment, a photonic link having low residual carrier, for use in transmitting information between an electronic signal source and an electronic signal receiver is provided. The photonic link comprises: a transmitter to accept electronic information from the electronic signal source and to transmit optical signals; the transmitter comprising an angle modulated optical source; and a first transmission path to convey the angle-modulated optical signal to a receiver apparatus; a receiver apparatus comprising a first and a second TOFD to convert the angle-modulated optical signals into intensity-modulated optical signals, the first TOFD being complementary to the second TOFD and wherein the TOFD are biased to provide large even-order distortion, to provide a first and second intensity-modulated signal, the first intensity-modulated signal being complementary to the second intensity-modulated signal; an optical balanced detector, comprising a first and a second photodetector, each having an anode and a cathode, wherein the anode of the first photodetector is connected to the cathode of the second photodetector; an optical transmission network to transmit the complementary intensity-modulated signals between the first and second TOFD and the optical balanced detector, whereby the optical balanced detector reconstructs the complementary intensity-modulated signals into the electronic information for acceptance by the electronic signal receiver.

In another embodiment, a method of transmitting information between an electronic signal source and an electronic signal receiver is provided comprising: accepting electronic information from the electronic signal source; angle modulating an optical source to produce an angle-modulated optical representation of the electronic information; transmitting the angle-modulated optical representation to each of two TOFDs; biasing each of two TOFDs to provide large even-order distortion; converting the angle-modulated optical representation into two complementary intensity-modulated optical signals with large even-order distortions; transmitting each of the complementary intensity-modulated optical signals to a photodetector; and reconstructing the complementary modulated signals into the electronic information for acceptance by the electronic signal receiver.

In one aspect of the method, the conversion is effected by TOFDs operating at a bias point such that the square root of the variance of the modulated optical signal frequency spectrum is greater than the difference between the carrier frequency and the threshold frequency of the TOFC.

In another aspect of the method, the conversion is effected by TOFDs operating at a bias point that provides a normalized modulation index of greater than approximately 0.7.

In another aspect of the method each of the TOFDs are operating with a threshold frequency that corresponds to less than approximately 25% maximum transmission towards the photodetector.

In another aspect of the method, each of the modulators are operating at a bias point of less than approximately 15% maximum transmission towards the photodetector.

In another aspect of the method, the angle modulation is implemented using a continuous-wave laser source and a phase modulator.

In another aspect of the method, the angle modulation is implemented using a directly-modulated laser diode.

In another aspect the method further comprises multiplexing to combine the complementary intensity-modulated optical signals for transmission on one transmission fiber.

In another aspect the method further comprises optical amplification.

In another embodiment, a photonic link having low residual carrier, for use in transmitting information between an electronic signal source and an electronic signal receiver is provided. The photonic link comprises: a transmitter to accept electronic information from the electronic signal source and to transmit optical signals, the transmitter comprising an angle-modulated optical source to convert the electronic signals into an optical angle-modulated representation; a TOFD to convert the angle modulated optical representation into an intensity-modulated optical signal, and wherein the TOFD is biased to provide large even-order distortion and in which the converter is biased such that the normalized modulation index exceeds 1; a first transmission path to convey the optical angle-modulated representation to the TOFD; an optical signal receiver; and a second optical transmission path to transmit the intensity-modulated optical signals between the TOFD and the optical signal receiver, whereby the optical signal receiver reconstructs the electronic information for acceptance by the electronic signal receiver, and in which the reconstructed electronic information contains large even-order distortion.

In one aspect, the first optical transmission path comprises a free-space optical path.

In another aspect, the second optical transmission path comprises a free-space optical path.

In another aspect, the first optical transmission path comprises an optical fiber.

In another aspect, the second optical transmission path comprises an optical fiber.

In another aspect, the information accepted from an electronic signal source extends over a band of frequencies such that the maximum frequency is less than twice the minimum frequency, rendering all even-order distortion products outside of the band of interest.

In yet another embodiment a method of transmitting information between an electronic signal source and an electronic signal receiver is provided comprising: accepting electronic information from the electronic signal source; angle modulating an optical carrier with the electronic information to obtain a optical angle-modulated representation of the electronic information; transmitting the optical angle-modulated representation to a TOFD; biasing the TOFD to provide large even-order distortion and a normalized modulation index exceeding 1; converting the optical angle-modulated representation into an optical intensity-modulated signal with large even-order distortions; transmitting the intensity-modulated optical signal to an optical receiver; and reconstructing the intensity-modulated optical signal into the electronic information for acceptance by the electronic signal receiver.

In one aspect of the method one of the optical signals are transmitted by a free-space optical path.

In another aspect of the method, the information being transmitted extends over a band of frequencies such that the maximum frequency is less than twice the minimum frequency, rendering all even-order distortion products outside of the band of interest.

The foregoing and other objects, features, and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Furthermore, the term "microwave information" refers to any form of microwave, millimeter wave, or analog radio-frequency signal. The term "threshold optical frequency discriminator (TOFD)" refers to an optical filter with a transmission-versus-frequency characteristic that exhibits a sharp turn on or threshold. The term "nonlinear threshold electrical-to-optical (E-O) converter (NTEOC)" refers to a device that has a light-output-versus-current (or voltage) transfer function that, when biased in the vicinity of the threshold, approximately half-wave rectifies an input microwave signal. Examples include laser diodes, externally modulated optical sources using Mach-Zehnder modulators or Electro-absorption modulators, and angle-modulated (frequency or phase) optical sources in conjunction with a threshold optical frequency discriminator (TOFD). The term "complementary converters or paths" refers to a pair of approximately identical converters or paths wherein the transfer function of one is inverted relative to the other with respect to the polarity of the input microwave information or the optical frequency relative to the optical carrier. The term "directly-modulated laser diode" refers to a laser diode or injection-locked laser diode that is intensity- or angle-modulated by modulation of applied current. The term "externally-modulated laser" refers to a laser operated by continuous-wave pumping but intensity- or angle-modulated using an external device such as a Mach-Zehnder (MZ) electro-optic modulator, electro-absorption modulator, or phase modulator. The term "optical communications path" refers to a single optical fiber or free-space optical connection between a transmitter and receiver. The term "balanced detector" refers to a pair of closely-matched photodetectors with the anode of one connected electrically to the cathode of the other, with the output signal taken from this junction.

Figure 1:
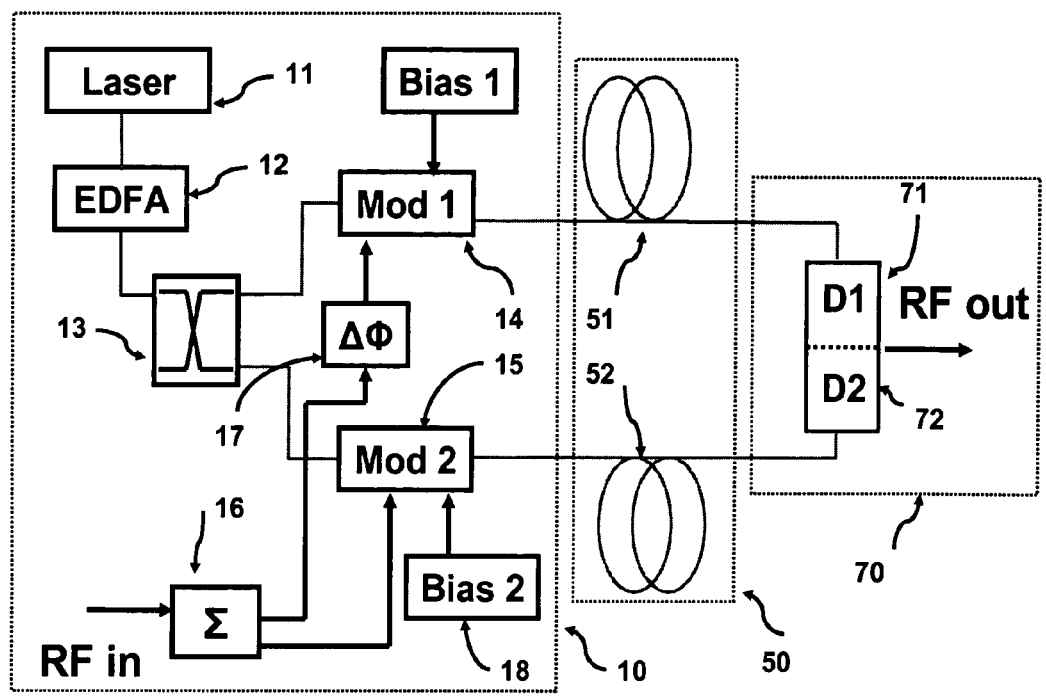
FIG. 1 is a schematic block diagram of a Class-AB photonic link in accordance with the prior art, based on the use of external modulators.

In order to describe the operation of the disclosed angle-modulated (AM) Class-AB (AM-CAB) techniques for MPLs, we begin with a review of the prior art of intensity-modulated Class-AB (IM-CAB) techniques. With IM-CAB (see T. E. Darcie, A. Moye, P. F. Driessen, J. Bull, H. Kato, N. A. F. Jaeger, "Noise reduction in class-AB microwave-photonic links," *IEEE Microwave Photonics* 2005 *Conference Proceedings* (Seoul, Korea, October 2005)), non-linear threshold electro-optic converters (NTEOCs) are used to ideally half-wave rectify the modulating signal in the output intensity modulation. Positive and negative portions of the signal are transmitted on separate but phase-matched (with respect to the microwave signal) optical paths, and recombined using a balanced photodetector, as illustrated in FIG. 1. An optical carrier generated by optical source 11 is split into two equal portions by coupler 13 and delivered to two complementary optical modulators 14 and 15. These are biased to appropriate operating points by voltage or current sources 18 and modulated about these bias points by the input microwave signal. Coupler 16 is used to provide identical modulation signals for each of the modulators 14, 15, and a phase controller 17 is used to control the relative phase of the modulating signals reaching the two modulators 14, 15. The coupler, modulators and phase controller components collectively comprise the transmitter 10.

An optical transmission path 50, comprised of first and second transmission fibers 51 and 52, deliver the complementary modulated signals to an optical signal receiver 70. This receiver 70 is a balanced photodetector consisting of two photodetectors, a first photodetector 71 and a second photodetector 72 with the anode of either the first 71 or second photodetector 72 connected to the cathode of the other photodetector. At this common junction, photocurrent generated in either the first 71 or second photodetector 72 is subtracted from that generated in the other photodetector, resulting in reconstruction of the original microwave signal as an output microwave signal to be received by an electronic signal receiver. The balanced detector recreates a replica of the complete input modulated signal, and does so with close to zero DC current. Hence noise associated with the DC (or residual carrier) is minimized.

A significant challenge associated with implementing Class-AB MPLs is in obtaining NTEOCs with appropriate transfer functions. Most intensity modulators are based on the MZ, and therefore have light intensity transmission-versus-voltage transfer functions that are sinusoidal. This is far from the ideal transfer function and results in a substantial departure from ideal system performance. Electro-absorption modulators have transfer functions that may have advantages over MZ, but these are generally limited in output power relative to MZ-based approaches. Direct laser modulation has the benefit of low cost, small size, and low power consumption. While simple in principle, several challenges must be overcome. Relative intensity noise (RIN) from lasers that can be directly-modulated (e.g. distributed feedback (DFB) lasers) tends to be high when operated only slightly above threshold. Also, the impedance of each laser diode, as seen by the microwave source, is a function of the laser bias. In the vicinity of the laser threshold current, the positive-negative junction begins to conduct, making a transition from an open circuit to a relatively low-impedance (a few ohms) at currents well above threshold. This raises challenges in designing a drive circuit for the pair of Class-AB lasers that will not induce additional signal distortion. Finally, lasers operated at low bias currents are subject to nonlinear distortion referred to as resonance distortion that results from photon-carrier dynamics within the laser diode. This distortion is exacerbated by the low resonance frequency associated with the low bias current.

Figure 2A:
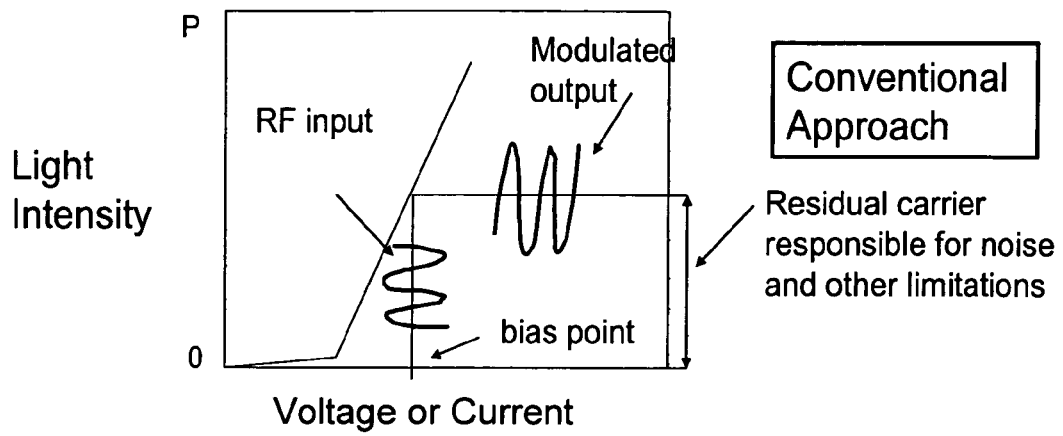
FIGS. 2(A) and 2(B) are graphs describing the construction of the effective transfer function for class AB operation using intensity modulators, in accordance with the prior art.
Figure 2B:
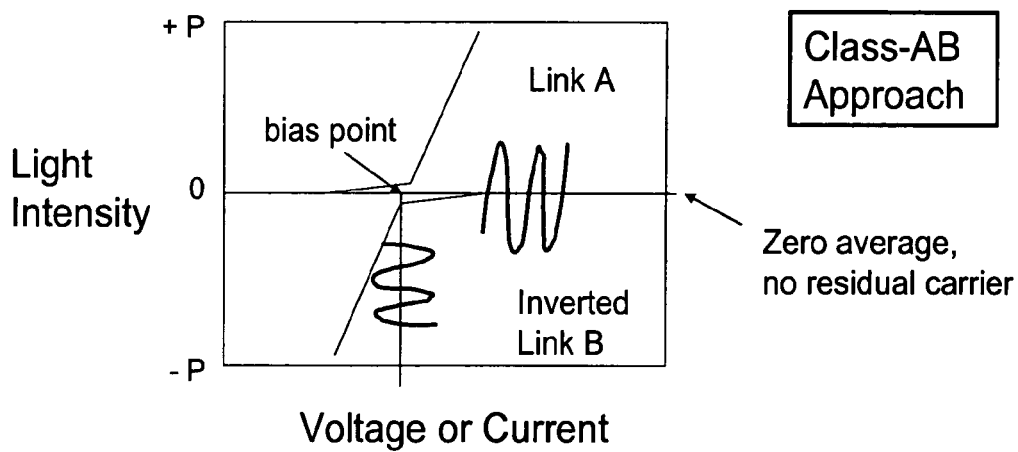

One feature of the modulated optical sources is that they exhibit substantially nonlinear or threshold behavior in the light-versus-voltage (or current) turn-on characteristics (or transfer function). Devices operated in this mode will be referred to as non-linear threshold electrical-to-optical (E-O) converters (NTEOC). This is generally the case for appropriately-biased directly-modulated lasers, and is approximately the case for appropriately-biased external modulators. The ideal transfer function for a NTEOC for IM-CAB applications is shown in FIG. 2B, in comparison with a similar device operated in a conventional manner. In conventional use, as shown in FIG. 2A, the bias point is high enough that modulation induced by the RF input creates a replica of the RF input in the modulated output optical intensity. This results in penalties arising from the DC bias point or residual carrier. In FIG. 2B, however, two devices are operated in a complementary manner, with each biased so as to provide only half of the modulated output signal. What is delivered into the first transmission fiber 51 from NTEOC 14 (FIG. 1) is essentially zero light for voltage (or current) below threshold, and a light intensity that is essentially linearly proportional to voltage above threshold. This is reversed for the complementary modulated source 15 that delivers modulated optical power into the second transmission fiber 52. Note that the complement can be realized by inverting the RF signal, and does not require design of a physically distinct NTEOC. It can be seen that the result of the subtraction in the optical signal receiver 70 is to create an effective transfer function for the link that is shown in FIG. 2B. Modulation by the input microwave signal about the bias point impresses one half of the half-wave-rectified microwave signal onto the light intensity in one transmission fiber 51, and the opposite half to the other transmission fiber 52. The result is a linear transfer function with zero average bias (or residual carrier).

It has been predicted that if the ideal NTEOC can be realized, substantial performance improvement can be realized. For a single modulating microwave carrier with a 10% modulation index, the shot noise is reduced by approximately 12 dB, relative to the shot noise in a conventional link. Likewise, intensity noise, which scales as the square of the received total power, is reduced by approximately 20 dB. Also, since the carrier is not present, more signal power can be launched into the transmission fibers 51, 52 or detected by the photodetectors 71, 72 before fiber nonlinearity or saturation becomes a problem. Hence substantial improvements in link performance can be achieved. However, achieving the ideal NTEOC with IM-CAB is difficult.

The present application discloses systems and methods to obtain nearly-ideal NTEOC function through the use of angle modulation (frequency or phase) of the optical carrier and novel optical filtering techniques using what will be referred to as a threshold optical frequency discriminator (TOFD). An example of this system is described in FIG. 3. A transmitter 100 is connected to a receiver 70 through two optical fibers 51 and 52, generally referred to as optical paths. The transmitter 100 includes an angle modulated laser 20 consisting of a laser 21 and an angle modulator 22, and coupler 13, also referred to as a power splitter, two optical circulators 16 and a set of complementary optical filters 14, 15. Microwave information is applied to modulator 22 to modulate either the frequency or phase of the signal emitted from the laser 21. This angle-modulated signal is split into two equal portions by a coupler 13. In this example, TOFDs 14, 15 reflect a portion of the input optical frequencies back through the circulators 16 to second couplers 32. Each coupler 32 samples a small portion of these signals for detection in photodetectors 31. The electronic signals generated by the detectors are used by controllers 30 to maintain the appropriate frequency position of the TOFDs with respect to the optical source frequency. The majority of the signals reflected from the TOFDs are passed through optical fibers 51, 52 to receiver 70. As with IM-CAB, this receiver 70 is a balanced photodetector consisting of two photodetectors, a first photodetector 71 and a second photodetector 72 with the anode of either the first 71 or second photodetector 72 connected to the cathode of the other photodetector. At this common junction, photocurrent generated in either the first 71 or second photodetector 72 is subtracted from that generated in the other photodetector, resulting in reconstruction of the original microwave signal as an output microwave signal to be received by an electronic signal receiver.

Figure 3:
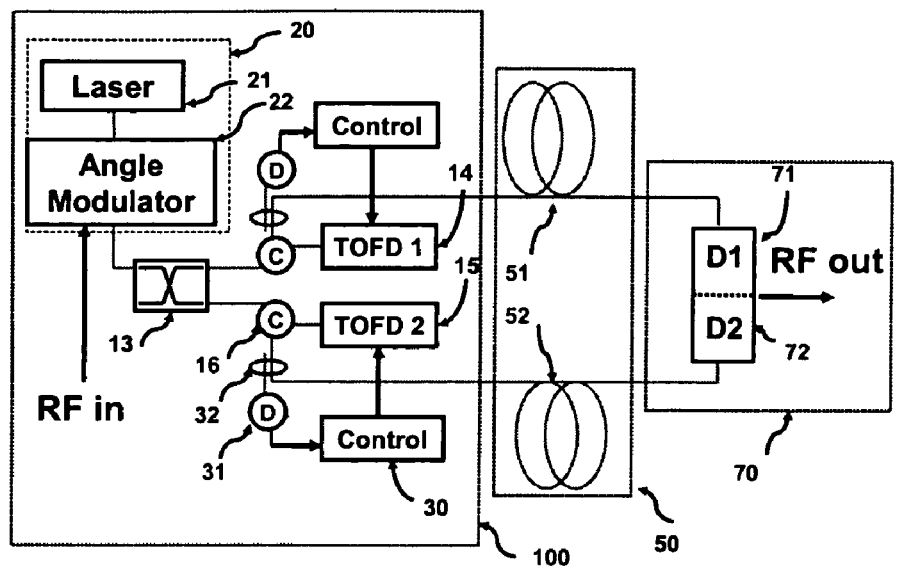
FIG. 3 is a schematic block diagram showing a laser that is externally phase modulated and separated into two paths at the transmitter, in accordance with an embodiment of the disclosed technology.

A variety of suitable angle modulators are available. FIG. 3 shows an un-modulated laser that is externally angle-modulated. This modulator would generally be a phase modulator made using electro-optic waveguides in materials such as Gallium Arsenide, or Lithium Niobate. Phase modulation has recently been demonstrated using waveguides based on Silicon. Alternatively, the angle-modulated optical source could be a diode laser that is directly frequency-modulated (or chirped) by applied modulation current. Numerous examples of compact tunable semiconductor laser sources have been propose and demonstrated, any of which could serve as the angle-modulated source.

It may also be desirable to recombine the two signals leaving couplers 32 into fibers 51, 52 by using a well-known multiplexing technique such as wavelength-division multiplexing or polarization combining, such that the two optical fibers 51, 52 can be replaced with a single transmission fiber. A suitable demultiplexor would then be inserted prior to receiver 70 to recreate the two inputs to detectors 71, 72.

Figure 4:
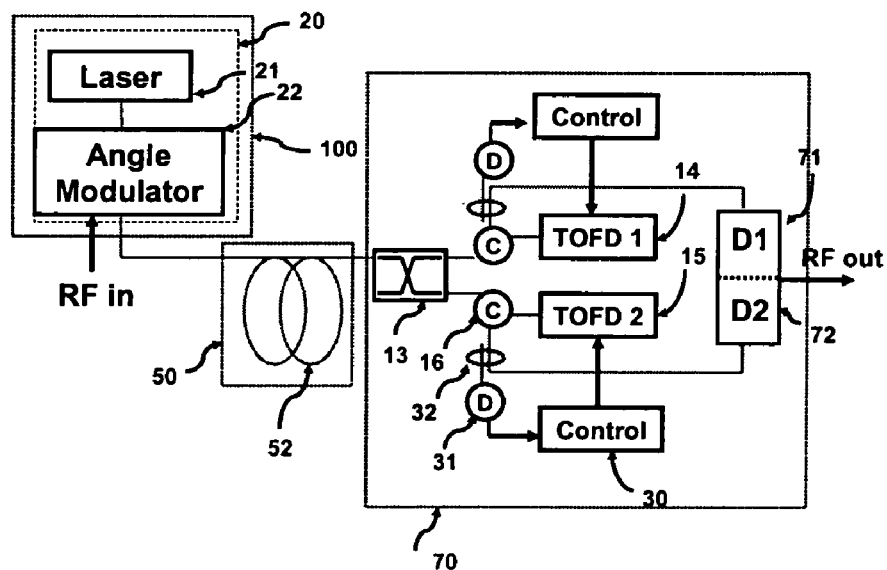
FIG. 4 is a schematic block diagram showing a photonic link in which the angle-modulated signal is sent over one optical path and separated into complementary signals at the receiver, in accordance with an embodiment of the disclosed technology.

An alternative embodiment of the present invention is shown in FIG. 4. Rather than creating two optical paths and placing the TOFDs in the transmitter (FIG. 3), the splitting and filtering operations are implemented at the receiver. The functions and numbering of the components now in receiver 70 are identical to those described above for FIG. 3. An advantage of FIG. 4 over FIG. 3 is that only one transmission path is required. Complexity is concentrated in the receiver, which may be an advantage or disadvantage depending on specifics of the application. A disadvantage is that the optical power levels in the fiber are higher, and may include some residual carrier (if the modulation index of the angle modulation is low). While this residual carrier will not be detected in detectors 70, 71, it may contribute to nonlinear effects in the transmission fiber 52.

Figure 5:
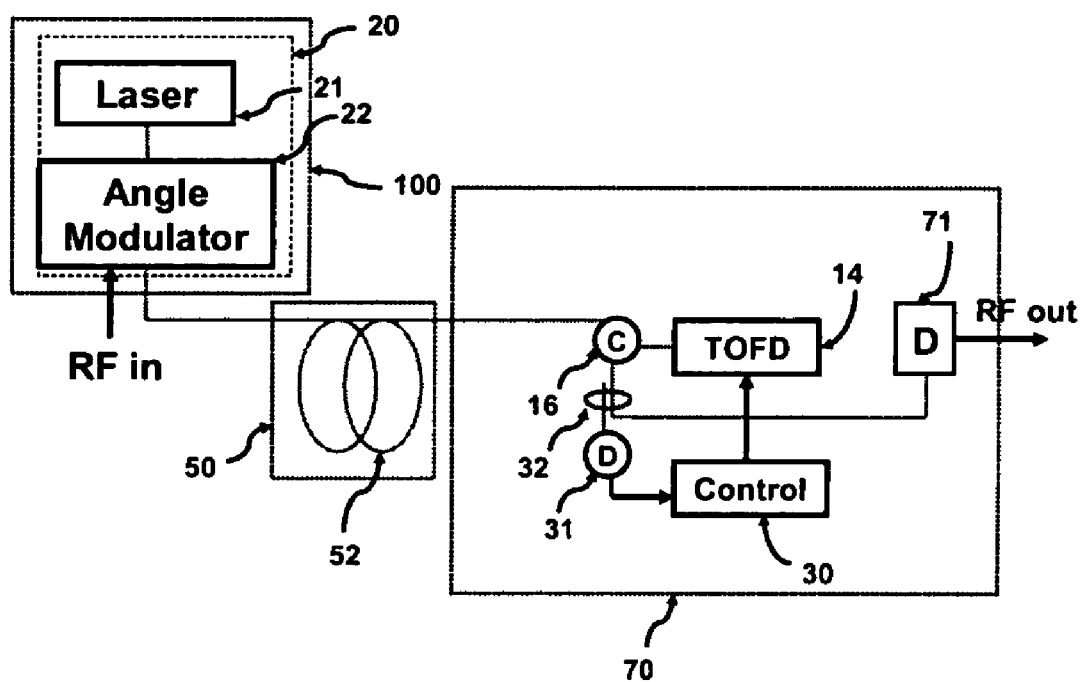
FIG. 5 is a schematic block diagram showing a photonic link that uses a single optical path in an unbalanced configuration in accordance with an embodiment of the disclosed technology.

Another embodiment of the invention is shown in FIG. 5, in which only one half of the balanced configuration of FIG. 4 is used. This could also be implemented with the TOFD at the transmitter, in accordance with FIG. 3. In this case, only signals corresponding to one polarity of the input microwave signal are detected. This reduces the detected RF signal power by 6 dB relative to the configuration of FIGS. 3 and 4, but also reduces the shot noise by 3 dB and simplifies the system substantially. It also results in a received signal that has high even-order nonlinear distortion, but this may be acceptable for a wide variety of applications wherein the microwave signal spectrum to be transmitted occupies only a narrow range of frequencies. While it has been demonstrated [18] that the use of FM modulation and a single optical filter or frequency discriminator can be used (in place of the TOFD) for MPLs, this has been done with a bias point that corresponds to a high average residual carrier. The use of TOFD with a shape described below and the alignment of the optical carrier frequency close to the threshold of the TOFD has not been suggested, and leads to significant reduction in overall noise along with the other advantages associated with the elimination of the residual carrier.

The key to successfully minimizing the detected residual carrier with FM-CAB is in the structure of the TOFDs 14, 15. These are designed to provide transmission-versus-frequency characteristics in accordance with FIG. 6. TOFD A has maximum transmission (or reflectivity) for optical frequencies less than $f_{A\,max}$ and zero transmission (or reflectivity) for frequencies greater than $f_C$. Between these two frequencies, the transmission (or reflectivity) of optical intensity is a linear function of the optical frequency. TOFD B has the inverse characteristic, as shown. Both filters are adjusted by well-known tuning mechanisms (angle, temperature, strain, etc.) such that the frequency of the un-modulated optical carrier coincides with the common $f_C$.

Operation of the link can be understood by considering a simple time-domain representation of a frequency-modulated (FM) signal, in which the instantaneous optical frequency is linearly proportional to the applied signal voltage. Assuming that the input microwave information has zero mean voltage (capacitively coupled, as is generally the case for microwave circuits), positive portions of the signal will result in optical frequencies greater than $f_C$ by an amount proportional to the voltage. TOFD B will pass these signals with intensity proportional to the instantaneous optical frequency, which is in turn proportional to the input voltage. Hence the output of TOFD B is ideally a half-wave rectified (positive half) replica of the input voltage. Similarly, the output of TOFD A is a half-wave rectified (negative half) replica of the input voltage. Since the photodetection process can only detect positive optical power, the balanced receiver subtracts one of these from the other, resulting in a complete reconstruction of the input microwave signal, while minimizing the detected DC photocurrent. A more rigorous treatment of the approach using spectral analysis reveals subtleties and detailed quantitative results, but does not affect the operating principles disclosed herein.

Figure 6:
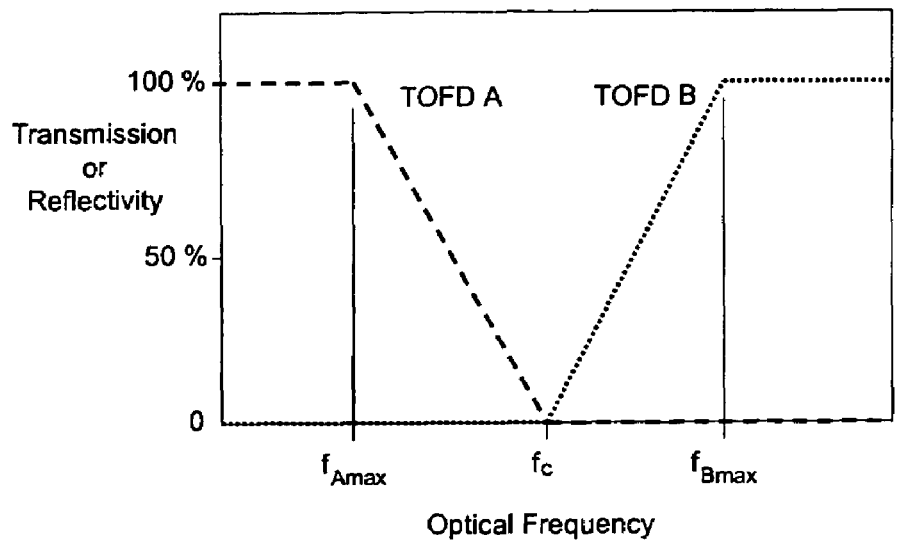
FIG. 6 is a graph describing the ideal transfer function for the threshold optical frequency discriminators, in accordance with an embodiment of the disclosed technology.

It is desirable to have as close to the ideal transfer functions described in FIG. 6 as possible. Sharp turn on at $f_C$ and high linearity of the optical discriminator (sloping portion of the TOFD shape) are desirable features. In addition, the phase response, as measured by the group delay, of the filters are desirably constant over the sloping portions. Otherwise, frequency dependence of the group delay will interact with effects such as chromatic dispersion to create nonlinear distortion in the output signals. Note that it may also be possible to alter the phase response to compensate for system-related impairments such chromatic dispersion of the transmission fiber.

A variety of filter technologies can be used to approximate suitable TOFD characteristics. These include thin film or interference filters, filters integrated on silicon-based optical waveguides, and fiber Bragg-grating filters. We have specified and had manufactured using standard fabrication techniques fiber Bragg-grating filters that provide nearly ideal characteristics. These devices provide a means of implementing CAB techniques using angle modulation with in a manner that provides almost ideal performance, while attempts to implement IM-CAB have been limited by the lack of ideal NTEOC. See, e.g., T. E. Darcie, A. Moye, P. F. Driessen, J. Bull, H. Kato, N. A. F. Jaeger, "Noise reduction in class-AB microwave-photonic links," *IEEE Microwave Photonics* 2005 *Conference Proceedings* (Seoul, Korea, October 2005). It is the combined interaction of the angle-modulated laser source and each TOFD that makes an NTEOC.

We have used the term angle modulation to represent both frequency (FM) and phase modulation (PM), which is common practice within the art. It is well known that the instantaneous frequency is the derivative of the phase. For typical narrowband microwave applications, in which the microwave signals occupy a small range of frequencies $\Delta\Omega$ relative to the center frequency $\Omega$, the relationship between FM and PM is straightforward. For example, for a phase modulated optical signal of the form $E(t)=E_O \cos(\omega_O t + kV(t))$, where the modulating microwave signal is of the form $V(t)=V_O \cos(\Omega t)$, the instantaneous optical frequency $\omega$ is derivative of the phase term $\omega_O t + kV(t)$ which is equal to $\omega_O - kV_O\Omega \sin \Omega t$. Hence PM results in what can be described as FM with peak frequency deviation $kV_O\Omega$ and a 90 degree phase shift. For narrowband applications, the difference introduced by the dependence of the frequency deviation on $\Omega$ is minor. If needed, the dependence of the FM frequency deviation on $\Omega$ can be compensated for using standard equalization techniques. Therefore, we can use FM and PM interchangeably, and recognize that standard techniques can be employed to convert between one and the other.

Under conditions of ideal balance between the two complementary paths 14 to 71 and 15 to 72, the even-order distortion generated by each TOFD (14) would be exactly cancelled by that of the other (15). The Class-AB approach is then capable of operation over a broad RF bandwidth (for example, 2-20 GHz) over which even-order distortion products must be tolerated. However, it is realized that substantial even-order distortion will be generated by each TOFD, and that exact cancellation will be difficult. For applications with small fractional bandwidths (for example, 5-10 GHz, or 19-20 GHz), all even-order distortion falls outside of the band of interest, and balancing is far less critical. The single-TOFD approach described in FIG. 5 is applicable to small fractional bandwidths only.

Figure 7:
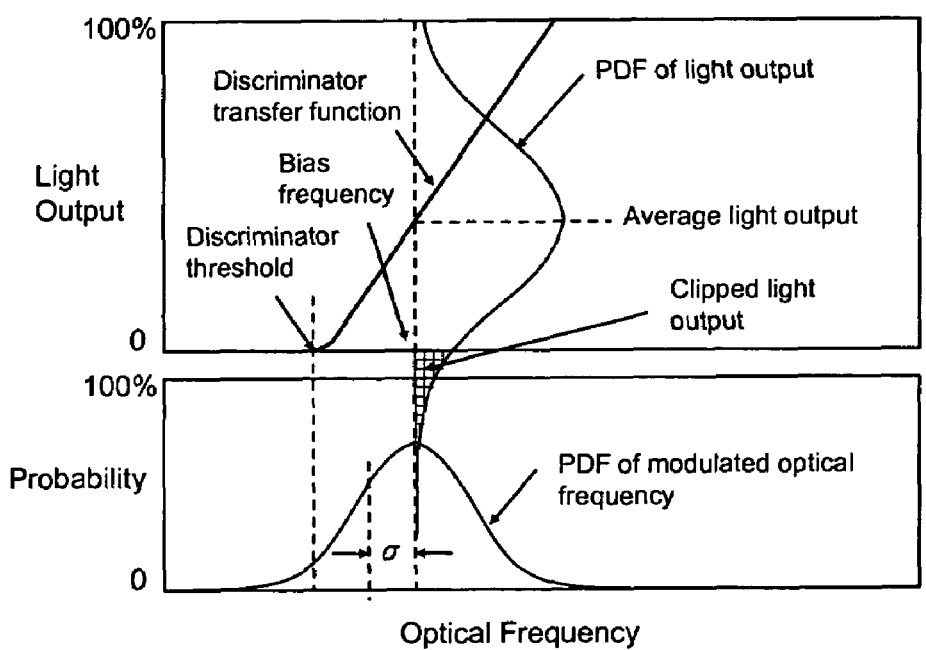
FIG. 7 defines a method for quantifying the operational difference between the invention and prior art, in terms of modulation conditions applied to each nonlinear threshold electric-to-optic converter.

Since the term "half-wave rectified" is somewhat subjective, it is useful to define means to quantify the degree of nonlinear rectification occurring in the TOFD-based NTEOC. FIG. 7 shows the transfer function of a TOFD with a sharp threshold. Under conditions where half-wave rectification were not desired, the TOFD would be biased (tuned to a frequency relative to the optical carrier frequency) that is sufficiently high that the addition of modulating microwave signal (voltage) and corresponding angle modulation creates a reasonably accurate replica of the microwave signal in light output. As the magnitude of the modulating signal increases, the excursion of the optical frequency on the low-frequency side of the optical carrier may be driven below the discriminator threshold, resulting in clipping of the light output, as shown in FIG. 7.

For arbitrary forms of microwave input signals, the probability of clipping in the TOFD can be seen in FIG. 7 from the overlap between the probability density function (PDF) of the optical frequency S(f) (which is linearly proportional to the input microwave signal voltage for FM), and the TOFD transfer function, as shown in FIG. 6. Distribution S(f) may take on a variety of forms depending on the form of the input microwave signal. The expected value can be defined as $$E(f^2)=\int_{-\infty}^{+\infty} f^2 S(f)df$$

a simple quantity representative of the statistical range of frequencies contained within the optical signal frequency-modulated by the microwave signal. If the input signal consists of a large number (N) of equal-amplitude sinusoidal signals, this PDF becomes a Gaussian distribution with standard deviation $\sigma^2$, where $\sigma$ is given by $\sigma=kV_p\sqrt{N/2}$. N is the number of channels, $V_p$ is the peak voltage for one channel, and k is the proportionality constant between the input microwave voltage and optical frequency. That is, a change input voltage of 1 volt results in a change in optical frequency of k GHz. In a conventional link, the ratio of $\sigma$ to the difference between bias and threshold frequencies of the TOFD is rarely greater that 0.4 (roughly as shown in FIG. 7). Since the difference between frequency of the optical carrier and the threshold of the TOFD translates directly to the average light output, and a translates directly to the square root of the variance of the light output (intensity modulation), this ratio is equivalent to the well-known normalized modulation index $\mu$. In the ideal (Class B) embodiment, the carrier frequency is equal to the threshold frequency. Therefore, $\mu$ becomes infinite. This corresponds to ideal half-wave rectification of the signal S(f) during conversion to modulated optical power. For non-ideal (class AB) some offset between carrier frequency and TOFD threshold bias voltage is used. While it is desirable to operate each of the complementary NTEOCs as close to half-wave rectification as possible, other practical concerns may prevent this. Therefore, a way to distinguish Class-AB operation from conventional operation is to define Class AB as operation in which each NTEOC is operated with $\mu$ greater than approximately 0.7. By using $\mu$, this metric can be applied to all forms of TOFD transfer functions. Alternatively, one could define Class-AB as operation with modulation conditions for which $\sigma$ is greater than the difference between the bias point and the threshold point.

Once the complementary optical signals have been generated at the outputs of each NTEOC, several configurations can be used to convey the signals to the photodetectors. A simple solution is to use two separate optical fibers 51 and 52, one for each signal, as defined in FIG. 3. This method is already used in conventional links where intensity noise is cancelled using a dual-output MZ. Alternatively, the two signals can be combined for transmission along a single fiber, then separated prior to the two detectors. The methods for combining could include, but are not limited to wavelength-division multiplexing, polarization multiplexing, and in principle, time-division multiplexing.

For single or dual-fiber implementations, the phases of the two received signals are desirably aligned. This can be done by adjusting or controlling the fiber lengths. Optical delay lines are available from many suppliers that enable fine tuning of the fiber length. Alternatively, the phase of the microwave signals can be adjusted after the photodetectors but before combining in the receiver.

Free-space communications could also benefit from the reduced noise achieved with Class-AB techniques. In this case, the optical fiber 50 or fibers 51, 52 of the optical transmission path 50 would be replaced with free-space optical path(s) between telescopes or lenses. The same considerations apply to single or dual-path approaches. Phase alignment can be done by varying the phase of the microwave signal, or by adjusting the optical path length.

Detection can be implemented using a balanced receiver 70, which subtracts the photocurrent generated in one detector directly from that generated in the other. Alternatively, two separate detectors 71 and 72 can be used, and the output of one inverted relative to the other prior to or during combining of the microwave signals. This can be done using a variety of microwave devices including 180 degree hybrids, inverters, and 90 degree hybrids. Any type of detector can be used, including PiN photodiodes, avalanche photodetectors, or MSM detectors.

The foregoing is a description of several embodiments of the invention. As would be known to one skilled in the art, variations that do not vary the scope of the invention are contemplated. For example, the angle-modulated optical source could be any source that allows frequency or phase of an optical carrier to be modulated in response to a microwave input. Optical amplification may be used to increase optical signal power at any point within the optical link. A variety of numerous microwave techniques may be employed to assist in creating an accurate or economical microwave circuit implementation.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A photonic link having low residual carrier, for use in transmitting information between an electronic signal source and an electronic signal receiver, said photonic link comprising:
    a transmitter to accept electronic information from said electronic signal source and to transmit optical signals, said transmitter comprising an angle-modulated optical source to convert said electronic information into an angle-modulated optical signal;
    a first and second threshold optical frequency discriminator (TOFD), each TOFD biased to provide large even-order distortion, said first TOFD being complementary to said second TOFD, to provide a first and second intensity-modulated signal, said first intensity-modulated signal being complementary to said second intensity-modulated signal;
    a first optical transmission network to distribute said angle-modulated optical signal from said transmitter to each of the first and second TOFD;
    an optical signal receiver; and
    a second optical transmission network to transmit said complementary intensity-modulated signals between said first and second TOFD and said optical signal receiver, whereby the optical signal receiver reconstructs said complementary modulated signals into said electronic information for acceptance by the electronic signal receiver.

2. The photonic link of claim 1 wherein said transmitter comprises an externally modulated laser.

3. The photonic link of claim 1 wherein said transmitter comprises a directly modulated laser.

4. The photonic link of claim 1 wherein said first optical transmission network comprises a power splitter and two optical paths.

5. The photonic link of claim 1 wherein said transmitter and said first and second TOFDs are co-located within a transmitter apparatus.

6. The photonic link of claim 1 wherein said receiver and said first and second TOFDs are co-located within a receiver apparatus.

7. The photonic link of claim 1 wherein said TOFDs are optical fiber Bragg-grating filters.

8. The photonic link of claim 1 wherein the first and second intensity-modulated signals are obtained by reflection from said TOFDs.

9. The photonic link of claim 1 wherein said TOFDs are implemented on planar silica-based waveguides.

10. The photonic link of claim 1 wherein said first and second intensity-modulated signals are obtained by transmission through said TOFDs.

11. The photonic link of claim 1 wherein said second optical transmission network comprises two optical paths.

12. The photonic link of claim 1 wherein said second optical transmission network includes a multiplexing apparatus to combine said two intensity-modulated optical signals onto one optical path.

13. The photonic link of claim 1 wherein said optical signal receiver comprises a balanced receiver.

14. The photonic link of claim 13 wherein said balanced receiver comprises a first and a second photodetector, each having an anode and a cathode, wherein said anode of said first photodetector is connected to the cathode of said second photodetector, such that in use, the electronic information is reconstructed.

15. The photonic link of claim 11 wherein said optical transmission paths comprise free-space optical paths.

16. The photonic link of claim 11 wherein said optical transmission paths comprise optical fiber paths.

17. A photonic link having low residual carrier, for use in transmitting information between an electronic signal source and an electronic signal receiver, said photonic link comprising:
    a transmitter to accept electronic information from said electronic signal source and to transmit optical signals;
    said transmitter comprising a first and second non-linear threshold electronic to optical converter (NTEOC) to convert said electronic information into optical signals, said first NTEOC being complementary to said second NTEOC and wherein said NTEOCs are biased to provide large even-order distortion, to provide a first and second modulated signal, said first modulated signal being complementary to said second modulated signal, said first and said second NTEOC comprising an angle-modulated optical source and a first and a second TOFD;
    an optical signal receiver, said optical signal receiver comprising a first and a second photodetector, each having an anode and a cathode, wherein said anode of said first photodetector is connected to the cathode of said second photodetector;
    an optical transmission network to transmit said complementary modulated signals between said transmitter and said optical signal receiver, whereby the optical signal receiver reconstructs said complementary modulated signals into said electronic information for acceptance by the electronic signal receiver.

18. The photonic link of claim 17 wherein said optical transmission network comprises two optical paths.

19. The photonic link of claim 17 wherein said optical transmission network comprises a multiplexing apparatus to combine said first and said second modulated signals onto one optical path.

20. A photonic link having low residual carrier, for use in transmitting information between an electronic signal source and an electronic signal receiver, said photonic link comprising:
    a transmitter to accept electronic information from said electronic signal source and to transmit optical signals;
    said transmitter comprising an angle modulated optical source;
    a first transmission path to convey the angle-modulated optical signal to a receiver apparatus, the receiver apparatus comprising a first and a second TOFD to convert said angle-modulated optical signal into intensity-modulated optical signals, said first TOFD being complementary to said second TOFD and wherein said TOFD are biased to provide large even-order distortion, to provide a first and second intensity-modulated signal, said first intensity-modulated signal being complementary to said second intensity-modulated signal;
    an optical balanced detector comprising a first and a second photodetector, each having an anode and a cathode, wherein said anode of said first photodetector is connected to the cathode of said second photodetector; and
    an optical transmission network to transmit said complementary intensity-modulated signals between said first and second TOFD and said optical balanced detector, whereby the optical balanced detector reconstructs said complementary intensity-modulated signals into said electronic information for acceptance by the electronic signal receiver.

21. A method of transmitting information between an electronic signal source and an electronic signal receiver comprising:
    accepting electronic information from said electronic signal source;
    angle modulating an optical source to produce an angle-modulated optical representation of said electronic information;
    transmitting said angle-modulated optical representation to each of two TOFDs;
    biasing each of the two TOFDs to provide large even-order distortion;
    converting said angle-modulated optical representation into two complementary intensity-modulated optical signals with large even-order distortions;
    transmitting each of said complementary intensity-modulated optical signals to a photodetector; and
    reconstructing said complementary modulated signals into said electronic information for acceptance by the electronic signal receiver.

22. The method of claim 21 wherein said conversion is effected by TOFDs operating at a bias point such that the square root of the variance of the modulated optical signal frequency spectrum is greater than the difference between the carrier frequency and the threshold frequency of the TOFC.

23. The method of claim 21 wherein said conversion is effected by TOFDs operating at a bias point that provides a normalized modulation index of greater than approximately 0.7.

24. The method of claim 21 wherein each of said TOFDs are operating with a threshold frequency that corresponds to less than approximately 25% maximum transmission towards said photodetector.

25. The method of claim 21 wherein each of said modulators are operating at a bias point of less than approximately 15% maximum transmission towards said photodetector.

26. The method of claim 21 wherein said angle modulation is implemented using a continuous-wave laser source and a phase modulator.

27. The method of claim 21 wherein said angle modulation is implemented using a directly-modulated laser diode.

28. The method of claim 21 further comprising multiplexing to combine said complementary intensity-modulated optical signals for transmission on one transmission fiber.

29. The method of claim 21 further comprising optical amplification.

30. A photonic link having low residual carrier, for use in transmitting information between an electronic signal source and an electronic signal receiver, said photonic link comprising:
    a transmitter to accept electronic information from said electronic signal source and to transmit optical signals, said transmitter comprising an angle-modulated optical source to convert said electronic signals into an optical angle-modulated representation;
    a TOFD to convert said angle modulated optical representation into an intensity-modulated optical signal, and wherein said TOFD is biased to provide large even-order distortion and in which said converter is biased such that the normalized modulation index exceeds 1;
    a first transmission path to convey said optical angle-modulated representation to said TOFD;
    an optical signal receiver; and
    a second optical transmission path to transmit said intensity-modulated optical signals between said TOFD and said optical signal receiver, whereby the optical signal receiver reconstructs said electronic information for acceptance by the electronic signal receiver, and in which the reconstructed electronic information contains large even-order distortion.

31. The photonic link of claim 30 wherein said first optical transmission path comprises a free-space optical path.

32. The photonic link of claim 30 wherein said second optical transmission path comprises a free-space optical path.

33. The photonic link of claim 30 wherein said first optical transmission path comprises an optical fiber.

34. The photonic link of claim 30 wherein said second optical transmission path comprises an optical fiber.

35. The photonic link of claim 30 wherein said information accepted from an electronic signal source extends over a band of frequencies such that the maximum frequency is less than twice the minimum frequency, rendering all even-order distortion products outside of the band of interest.

36. A method of transmitting information between an electronic signal source and an electronic signal receiver comprising:
    accepting electronic information from said electronic signal source;

angle modulating an optical carrier with said electronic information to obtain an optical angle-modulated representation of the electronic information;

transmitting said optical angle-modulated representation to a TOFD;

biasing said TOFD to provide large even-order distortion and a normalized modulation index exceeding 1;

converting said optical angle-modulated representation into an optical intensity-modulated signal with large even-order distortions;

transmitting said intensity-modulated optical signal to an optical receiver; and reconstructing said intensity-modulated optical signal into said electronic information for acceptance by the electronic signal receiver.

37. The method of claim 36, wherein one of said optical signals is transmitted by a free-space optical path.

38. The method of claim 36, wherein said information being transmitted extends over a band of frequencies such that the maximum frequency is less than twice the minimum frequency, rendering all even-order distortion products outside of the band of interest.

* * * * *